United States Patent
Oh et al.

(10) Patent No.: US 11,964,241 B2
(45) Date of Patent: Apr. 23, 2024

(54) GAS SEPARATION MEMBRANE COMPRISING METAL-ORGANIC FRAMEWORK AND METHOD OF MANUFACTURING SAME

(71) Applicants: Hyundai Motor Company, Seoul (KR); Kia Corporation, Seoul (KR); Gachon University of Industry-Academic Cooperation Foundation, Seongnam-si (KR)

(72) Inventors: Gwang Seok Oh, Seoul (KR); Jihyun Lee, Ansan-si (KR); Minyoung Yoon, Seoul (KR)

(73) Assignees: Hyundai Motor Company, Seoul (KR); Kia Corporation, Seoul (KR); Gachon University of Industry-Academic Cooperation Foundation, Seongnam-si (KR)

( * ) Notice: Subject to any disclaimer, the term of this patent is extended or adjusted under 35 U.S.C. 154(b) by 0 days.

(21) Appl. No.: 18/334,639

(22) Filed: Jun. 14, 2023

(65) Prior Publication Data
US 2023/0321612 A1 Oct. 12, 2023

Related U.S. Application Data

(62) Division of application No. 16/917,103, filed on Jun. 30, 2020.

(30) Foreign Application Priority Data

Nov. 14, 2019 (KR) .................. 10-2019-0145552

(51) Int. Cl.
*B01D 53/22* (2006.01)
*B01D 67/00* (2006.01)
(Continued)

(52) U.S. Cl.
CPC ....... *B01D 69/148* (2013.01); *B01D 67/0006* (2013.01); *B01D 67/0079* (2013.01);
(Continued)

(58) Field of Classification Search
CPC ...... B01D 69/148; B01D 71/34; B01D 71/82; B01D 67/0079; B01D 2325/04;
(Continued)

(56) References Cited

U.S. PATENT DOCUMENTS 6,586,802 B2 7/2003 Miyamoto et al.
9,757,710 B1 9/2017 Xu et al.
(Continued)

OTHER PUBLICATIONS

Zhang, Yuanyan, et al., "Challenges and recent advances in MOF-polymer composite membranes for gas separation", Inorganic Chemistry Frontiers, vol. 3, No. 7, Jul. 2016, 15 pages.
(Continued)

*Primary Examiner* — Anthony R Shumate
(74) *Attorney, Agent, or Firm* — Slater Matsil, LLP

(57) ABSTRACT

A lithium-air battery includes a battery cell and a case configured to accommodate the battery cell. The case includes an inlet communicating with outside and an outlet communicating with outside. At least one of the inlet and the outlet is equipped with a gas separation membrane that includes a matrix including a polymer resin and a metal-organic framework (MOF) dispersed in the matrix. The gas separation membrane has a thickness of 150 μm or more.

20 Claims, 6 Drawing Sheets

(51) Int. Cl.
*B01D 69/14* (2006.01)
*B01D 71/34* (2006.01)
*B01D 71/64* (2006.01)
*B01D 71/68* (2006.01)
*B01D 71/70* (2006.01)
*B01D 71/82* (2006.01)

(52) U.S. Cl.
CPC ............. *B01D 71/34* (2013.01); *B01D 71/64* (2013.01); *B01D 71/68* (2013.01); *B01D 71/70* (2013.01); *B01D 71/82* (2013.01); *B01D 2325/02* (2013.01); *B01D 2325/04* (2013.01)

(58) Field of Classification Search
CPC ............ B01D 2325/02; B01D 67/0006; B01D 71/68; B01D 71/70; B01D 71/64
See application file for complete search history.

(56) References Cited

U.S. PATENT DOCUMENTS

| | | | |
|---|---|---|---|
| 9,861,932 B2 | 1/2018 | Lee et al. | |
| 10,076,728 B2* | 9/2018 | Song | B01D 71/0281 |
| 2006/0230926 A1 | 10/2006 | Fritsch et al. | |
| 2016/0263531 A1* | 9/2016 | Odeh | B01D 53/228 |
| 2016/0263532 A1* | 9/2016 | Odeh | B01D 69/06 |
| 2016/0263533 A1* | 9/2016 | Odeh | B01D 67/009 |
| 2017/0158809 A1* | 6/2017 | Gleason | B01D 53/228 |
| 2018/0304193 A1* | 10/2018 | Al-Maythalony | B01D 71/68 |
| 2018/0326398 A1* | 11/2018 | Nair | B01D 71/028 |
| 2019/0224643 A1* | 7/2019 | Belmabkhout | C10L 3/103 |
| 2019/0321787 A1* | 10/2019 | Sivaniah | B01D 71/024 |
| 2020/0115395 A1 | 4/2020 | Baek et al. | |
| 2020/0197901 A1* | 6/2020 | Lu | B01J 20/3085 |
| 2020/0269194 A1* | 8/2020 | Al-Maythalony | B01D 69/02 |
| 2021/0053024 A1* | 2/2021 | Luz Minguez | B01J 20/28026 |
| 2021/0130372 A1* | 5/2021 | Smith | B01D 67/0079 |
| 2021/0146315 A1 | 5/2021 | Oh et al. | |

OTHER PUBLICATIONS

Ruan, Ranli, et al., "A perfluorocarbon-silicone oil oxygen-selective membrane for ambient operation of aprotic Li-air batteries", Electrochemistry Communications 96 (2018), pp. 93-97.

Qiu, Shilun, et al., "Metal-organic framework membranes: from synthesis to separation application", Chemical Society Reviews, vol. 24, May 9, 2014, pp. 6116-6140.

Park, Ho Bum, et al., "Maximizing the right stuff: The trade-off between membrane permeability and selectivity", Science, vol. 356, Issue 6343, Jun. 16, 2017, 12 pages.

Cao, Lujie, et al., "A high performance 02 selective membrane based on CAU-1-NH2@polydopamine and the PMMA polymer for Li-air batteries", Chemical Communications, vol. 51, No. 21, Mar. 14, 2015, pp. 4364-4367.

* cited by examiner

GAS SEPARATION MEMBRANE COMPRISING METAL-ORGANIC FRAMEWORK AND METHOD OF MANUFACTURING SAME

CROSS-REFERENCE TO RELATED APPLICATIONS

This application is a division of U.S. application Ser. No. 16/917,103, filed on Jun. 30, 2020, which claims priority to Korean Patent Application No. 10-2019-0145552, filed on Nov. 14, 2019, which applications are hereby incorporated herein by reference.

TECHNICAL FIELD

The present invention relates to a gas separation membrane and to a method of manufacturing the same.

BACKGROUND

Recently, a lithium-air battery using oxygen gas in the air as a cathode active material has been receiving attention as a next-generation battery, and thus thorough research into a gas separation membrane that selectively separates only oxygen gas from the air to enable the oxygen gas to permeate into the battery is ongoing.

However, it is very difficult to both increase the oxygen gas selectivity and improve the permeability thereof.

For example, when manufacturing a porous gas separation membrane so as to increase the permeability of oxygen gas, the selectivity for oxygen gas is lowered. Moreover, the permeability of an organic compound used as the electrolyte is increased, and thus an electrolyte depletion phenomenon occurs.

It has been reported that the introduction of various functional groups into the polymer forming the gas separation membrane may increase the permeability of oxygen and may decrease the permeability of organic compounds and carbon dioxide, but the price rises with the introduction of functional groups, making it difficult to attain market competitiveness.

SUMMARY

The present invention relates to a gas separation membrane and to a method of manufacturing the same. Particular embodiments relate to a gas separation membrane which includes a metal-organic framework and is thus capable of selectively permeating oxygen in a larger amount. Here, the gas separation membrane may be appropriately used for electrochemical devices that are selectively permeable to oxygen, such as lithium-air batteries, fuel cells and the like.

Accordingly, embodiments of the present invention have been made keeping in mind problems encountered in the related art, and an embodiment of the present invention provides a gas separation membrane having high permeability of oxygen gas and low permeability of organic compounds and carbon dioxide.

Objectives of embodiments of the present invention are not limited to the foregoing, and will be able to be clearly understood through the following description and to be realized by the means described in the claims and combinations thereof.

An embodiment of the present invention provides a gas separation membrane including a matrix including a polymer resin and a metal-organic framework (MOF) dispersed in the matrix.

The polymer resin may be selected from the group consisting of polyimide, polysulfone, polydimethylsiloxane (PDMS), polyvinylidene fluoride (PVDF), and combinations thereof.

The metal-organic framework may include a metal ion or metal ion cluster and an organic ligand for connection thereof.

The metal ion may include an ion of a metal selected from the group consisting of Zr, Hf, Cr, Ti, Al, Fe, Cu, Co, Mn, Mg, Ni and combinations thereof.

The organic ligand may be selected from the group consisting of aromatic dicarboxylic acid, aromatic tricarboxylic acid, imidazole compound, and combinations thereof.

The metal-organic framework may be selected from the group consisting of UiO-66, UiO-66-$NH_2$, UiO-67, MIL-lot, MIL-125, MIL-53, MIL-100, HKUST-1, $Co(fm)_2$, $Mn(fm)_2$, $Mg(fm)_2$ and combinations thereof.

The metal-organic framework may be a porous crystalline compound, the average diameter of pores therein ranging from 0.5 nm to 10 nm.

The metal-organic framework may have a specific surface area of 100 $m^2/g$ or more.

The amount of the metal-organic framework may be 5 wt % to 20 wt %.

The gas separation membrane may have a thickness of 10 μm or more.

Another embodiment of the present invention provides a method of manufacturing a gas separation membrane, including preparing a composition including a polymer resin monomer, a solvent and a metal-organic framework, casting the composition on a substrate, and polymerizing the polymer resin monomer.

Here, the polymer resin monomer may be polymerized by thermally treating the composition cast on the substrate.

According to embodiments of the present invention, the gas separation membrane can be selectively permeable to oxygen gas, and because of the high permeability thereof, the gas separation membrane is appropriate for use in electrochemical devices such as lithium-air batteries, fuel cells and the like that require oxygen gas for operation.

The effects of embodiments of the present invention are not limited to the foregoing, and should be understood to include all effects that can be reasonably anticipated from the following description.

DETAILED DESCRIPTION OF ILLUSTRATIVE EMBODIMENTS

The above and other objectives, features, and advantages of embodiments of the present invention will be more clearly understood from the following preferred embodiments taken in conjunction with the accompanying drawings. However, the present invention is not limited to the embodiments disclosed herein, and may be modified into different forms. These embodiments are provided to thoroughly explain the invention and to sufficiently transfer the spirit of the present invention to those skilled in the art.

It will be further understood that the terms "comprise", "include", "have", etc., when used in this specification, specify the presence of stated features, integers, steps, operations, elements, components, or combinations thereof, but do not preclude the presence or addition of one or more other features, integers, steps, operations, elements, components, or combinations thereof. Also, it will be understood that when an element such as a layer, film, area, or sheet is referred to as being "on" another element, it can be directly on the other element, or intervening elements may be present therebetween. Similarly, when an element such as a layer, film, area, or sheet is referred to as being "under" another element, it can be directly under the other element, or intervening elements may be present therebetween.

Unless otherwise specified, all numbers, values, and/or representations that express the amounts of components, reaction conditions, polymer compositions, and mixtures used herein are to be taken as approximations including various uncertainties affecting the measurements that essentially occur in obtaining these values, among others, and thus should be understood to be modified by the term "about" in all cases. Furthermore, when a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated.

Figure 1:
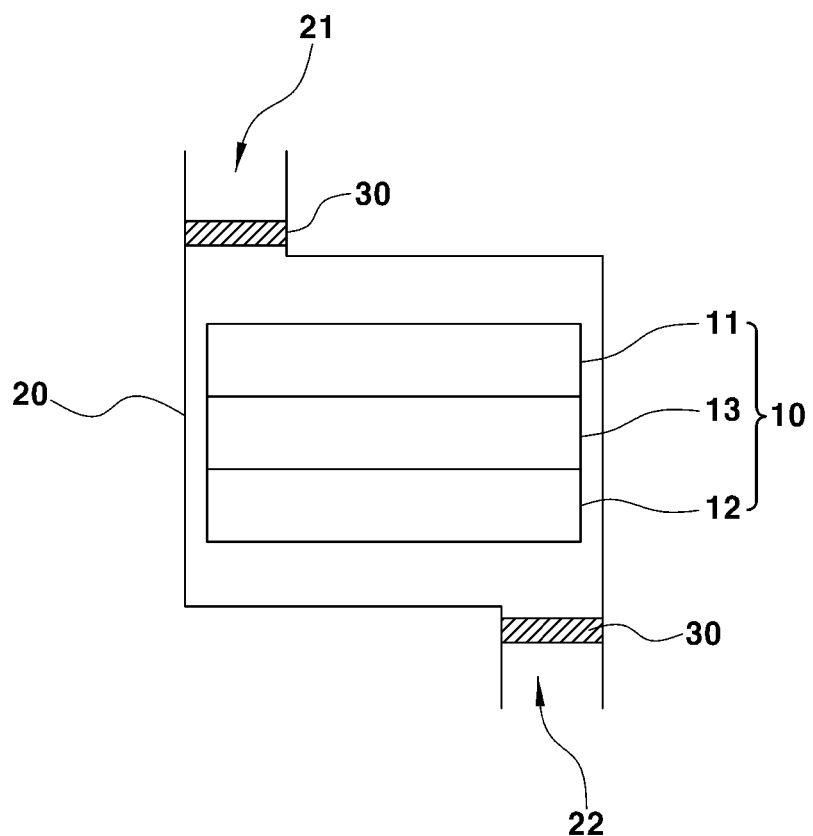
FIG. 1 is a cross-sectional view schematically showing a lithium-air battery according to an embodiment of the present invention.

FIG. 1 is a cross-sectional view schematically showing a lithium-air battery according to an embodiment of the present invention. With reference thereto, the lithium-air battery includes a battery cell 10 and a case 20 accommodating the battery cell 10.

The battery cell 10 includes a cathode 11, an anode 12, and an electrolyte layer 13. The battery cell 10 may be a battery system using lithium as the anode 12 and using oxygen in the air as the active material at the cathode 11. At the anode 12, the oxidation and reduction of lithium occur, and at the cathode 11, the reduction and oxidation of oxygen introduced from the outside occur.

Schemes 1 and 2 below represent reactions occurring at the anode 12 and the cathode 11 when the battery cell 10 is discharged.

(Anode): Li→Li$^+$+$e^-$ [Scheme 1]

(Cathode): 2Li$_+$+O$_2$+2$e_-$→Li$_2$O$_2$ [Scheme 2]

The lithium metal of the anode 12 is oxidized to produce lithium ions and electrons. Lithium ions move to the cathode 11 through the electrolyte layer 13 and electrons move to the cathode 11 through a current collector and an external conductor. Since the cathode 11 is porous, external air may be introduced thereto. Oxygen contained in the external air is reduced by the electrons at the cathode 11, and Li$_2$O$_2$ is formed as a discharge product.

The charging reaction is the reverse thereof. As represented in Scheme 3 below, Li$_2$O$_2$ is decomposed at the cathode 11 to generate lithium ions and electrons.

(Cathode)Li$_2$O$_2$→2Li$^+$+O$_2$+2$e^-$ [Scheme 3]

The electrolyte layer 13 is positioned between the cathode 11 and the anode 12 to allow lithium ions to move between the cathode and the anode. The electrolyte layer 13 is not particularly limited, and may be, for example, made of a solid electrolyte, or may be configured such that the separation membrane is impregnated with a liquid electrolyte.

As described above, in order for the battery cell 10 to operate, oxygen gas must be supplied from the outside. Therefore, the case 20 accommodating the battery cell 10 may be provided with an inlet 21 communicating with the outside.

In this case, in order to selectively supply only oxygen gas to the battery cell 10, the inlet 21 may be equipped with a gas separation membrane 30 that may be selectively permeable to oxygen gas contained in the external gas. However, the position of the gas separation membrane 30 is not limited to the inlet 21, and the gas separation membrane may be provided at any position, so long as it is able to filter the external gas supplied to the battery cell 10.

Also, the gas separation membrane 30 may be mounted to an outlet 22 for exhausting gas from the case 20. Since the lithium-air battery is connected to the outside rather than being sealed, the liquid electrolyte of the battery cell 10 may evaporate and be exhausted to the outlet 22. Since the organic compound constituting the liquid electrolyte does not pass through the gas separation membrane 30, when the gas separation membrane 30 is mounted to the outlet 22, electrolyte depletion of the battery cell 10 may be prevented.

Figure 2:
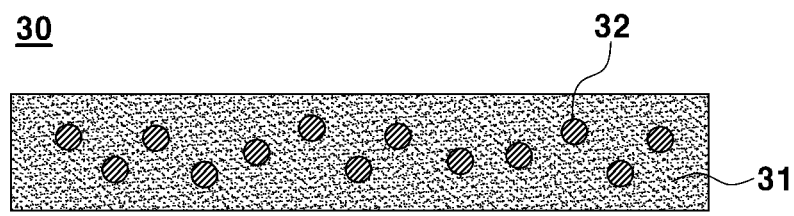
FIG. 2 is a cross-sectional view schematically showing a gas separation membrane according to an embodiment of the present invention.

FIG. 2 is a schematic cross-sectional view of the gas separation membrane 30. With reference thereto, the gas separation membrane 30 may include a matrix 31 including a polymer resin and a metal-organic framework (MOF) 32 dispersed in the matrix 31.

The polymer resin may be selected from the group consisting of, for example, polyimide, polysulfone, polydimethylsiloxane (PDMS), polyvinylidene fluoride (PVDF), and combinations thereof.

The metal-organic framework 32 is evenly distributed in the matrix 31 without aggregation.

Figure 3A:
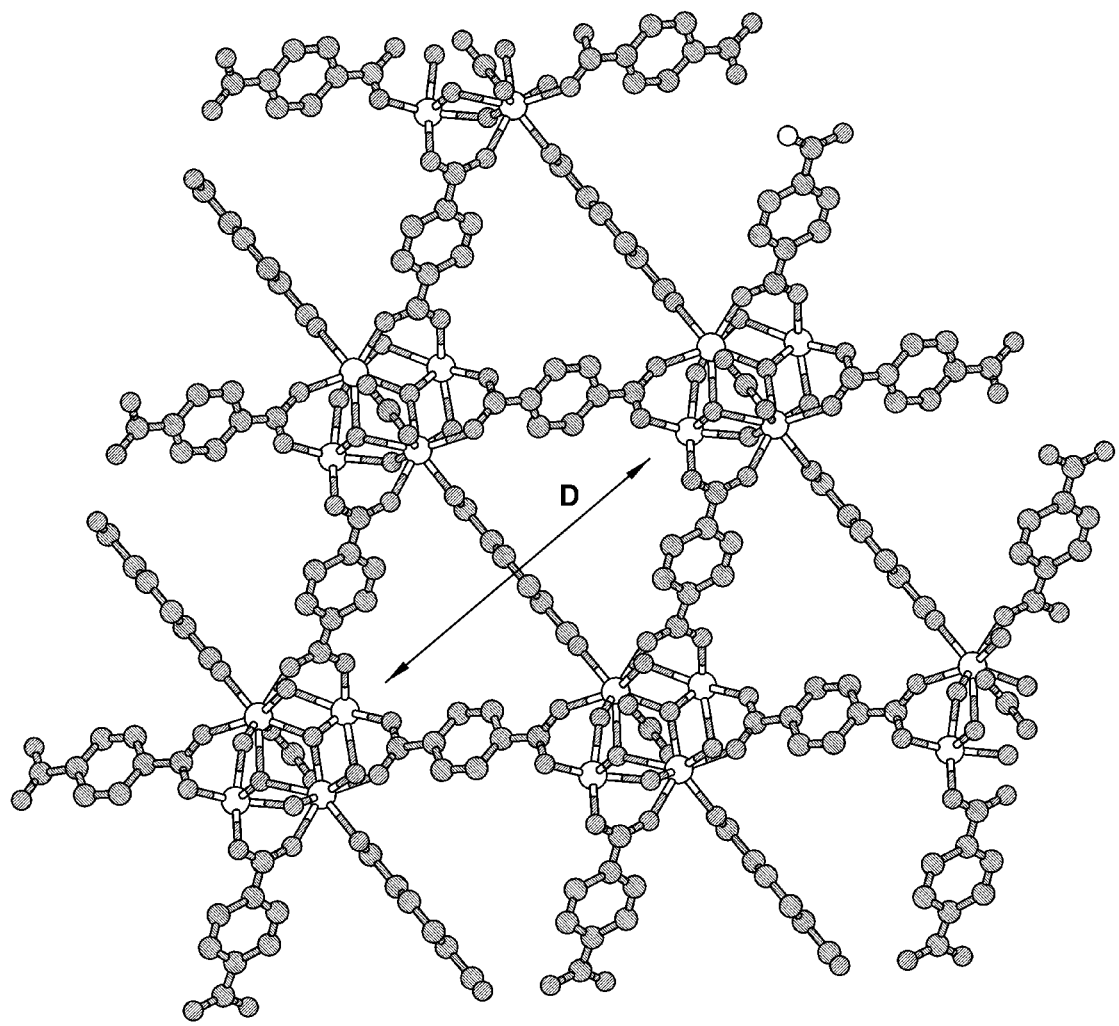
FIG. 3A shows the overall structure of UiO-66 usable as the metal-organic framework of an embodiment of the present invention.
Figure 3B:
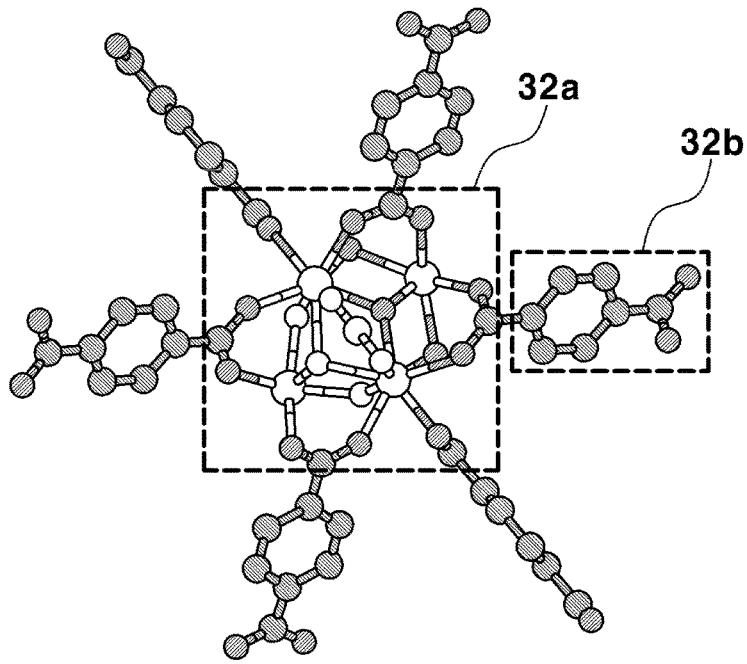
FIG. 3B shows the unit cell of UiO-66.

FIG. 3A shows the overall structure of UiO-66 usable as the metal-organic framework 32, and FIG. 3B shows the unit cell of UiO-66. With reference thereto, the metal-organic framework 32 may be understood to be a porous crystalline compound formed by chemically binding a metal ion or metal ion cluster 32a to an organic ligand 32b.

The metal ion 32a may include an ion of a metal selected from the group consisting of, for example, Zr, Hf, Cr, Ti, Al, Fe, Cu, Co, Mn, Mg, Ni, and combinations thereof. The metal-organic framework 32 may include an oxo-centered metal cluster ion including the metal ion.

The organic ligand 32b may be an organic material having a group capable of coordination bonding, ionic bonding, or covalent bonding, such as carboxylic acid or imidazole. In order to form a stable metal-organic framework, an organic material having two or more sites capable of coordination bonding, ionic bonding or covalent bonding, namely bidentate, tridentate, etc., is favorably used.

The organic ligand 32b may be selected from the group consisting of, for example, aromatic dicarboxylic acid, aromatic tricarboxylic acid, imidazole compound, and combinations thereof.

Examples of the aromatic dicarboxylic acid or aromatic tricarboxylic acid may include benzene dicarboxylic acid such as benzene-1,2-dicarboxylic acid (or o-phthalic acid), benzene-1,3-dicarboxylic acid (or m-phthalic acid), and benzene-1,4-dicarboxylic acid (or p-phthalic acid), benzene tricarboxylic acid such as benzene-1,3,5-tricarboxylic acid (or trimesic acid), naphthalene dicarboxylic acid, biphenyl dicarboxylic acid, or triphenyl dicarboxylic acid, and organic ligands having functional groups, such as amines, alcohols, etc. added to the aromatic ring.

The imidazole compound may include imidazole, aminoimidazole, hydroxyimidazole, and benzimidazole.

The metal-organic framework 32 may be selected from the group consisting of, for example, UiO-66 (zirconium 1,4-benzenedicarboxylate), UiO-66-$NH_2$ (zirconium 2-amino-1,4-benzenedicarboxylate), UiO-67 (zirconium biphenyldicarboxylate), MIL-101 (iron 1,4-benzenedicarboxylate), MIL-125 (titanium 1,4-benzenedcarboxylate), MIL-53 (aluminum 1,4-benzenedicarboxylate), MIL-100 (iron 1,3,5-benzenetricarboxylate), HKUST-1 (copper 1,3,5-benzenetricarboxylate), Co(fm)$_2$ (cobalt formate), Mn(fm)$_2$ (manganese formate), Mg(fm)$_2$ (magnesium formate) and combinations thereof.

The average diameter of the metal-organic framework 32 may be, for example, 20 nm to 10 μm. The average diameter of the metal-organic framework 32 may be, for example, 100 nm to 1 μm. The average diameter of the metal-organic framework 32 may be, for example, 300 nm to Boo nm.

The specific surface area of the metal-organic framework 32 may be, for example, 100 $m^2/g$ or more. The specific surface area of the metal-organic framework 32 may be, for example, 500 $m^2/g$ or more. The specific surface area of the metal-organic framework 32 may be, for example, 1000 $m^2/g$ or more.

The metal-organic framework 32 has pores of various sizes therein, and the average diameter of the largest pores (D of FIG. 3A) may be, for example, 0.5 nm to 10 nm. Therefore, oxygen gas may pass through the pores, but an organic compound having a large molecular weight such as an electrolyte cannot pass through the pores.

The metal-organic framework 32 may have various shapes such as a spherical, elliptical, cylindrical, triangular, rectangular, or polyhedral shape. For example, the metal-organic framework 32 may be spherical.

The gas separation membrane 30 may include 80 wt % to 95 wt % of the matrix 31 and 5 wt % to 20 wt % of the metal-organic framework 32. When the amount of the metal-organic framework 32 falls in the above range, the oxygen permeability of the gas separation membrane 30 may be increased, and the permeation of carbon dioxide and organic compounds may be prevented.

The gas separation membrane 30 may have, for example, a thickness of 10 μm or more. The gas separation membrane 30 may be, for example, 50 μm or more in thickness. The gas separation membrane 30 may have, for example, a thickness of 100 μm or more. The upper limit of the thickness of the gas separation membrane 30 is not particularly limited, but the gas separation membrane 30 may have a thickness of 500 μm or less. When the thickness of the gas separation membrane 30 is 100 μm or more, oxygen permeability may be maintained high and the organic compound may be prevented from passing through the gas separation membrane 30.

The characteristics of the gas separation membrane 30 according to embodiments of the present invention are as follows.

The gas separation membrane 30 is thicker than a typical gas separation membrane. A polyethylene terephthalate film, a polyimide film, and the like, which are typical gas separation membranes, are manufactured to a thickness of about 40 μm to 60 μm in order to increase gas permeability. On the other hand, the gas separation membrane 30 according to embodiments of the present invention has a thickness of 150 μm or more. Therefore, passage of organic compounds may be suppressed. Moreover, as described above, since the average diameter of pores in the metal-organic framework 32 included in the gas separation membrane 30 is smaller than the size of the organic compound, passage of organic compounds may be more effectively suppressed.

Meanwhile, when the gas separation membrane is thick, the permeability of oxygen gas as well as the organic compound may be decreased. The gas separation membrane 30 according to embodiments of the present invention avoids the above problem by uniformly dispersing the porous metal-organic framework 32 in the matrix 31. The oxygen gas flowing into the gas separation membrane 30 may easily pass through the gas separation membrane 30 via the pores in the metal-organic framework 32 and the interface between the pores of the metal-organic framework 32 and the polymer resin of the matrix 31.

Also, since the metal-organic framework 32 included in the gas separation membrane 30 according to embodiments of the present invention has carbon dioxide adsorption capability, carbon dioxide contained in the external gas may be prevented from permeating through the gas separation membrane 30.

Consequently, when the gas separation membrane 30 is applied to a lithium-air battery or a fuel cell, the driving efficiency and lifespan of the battery may be improved.

Figure 4:
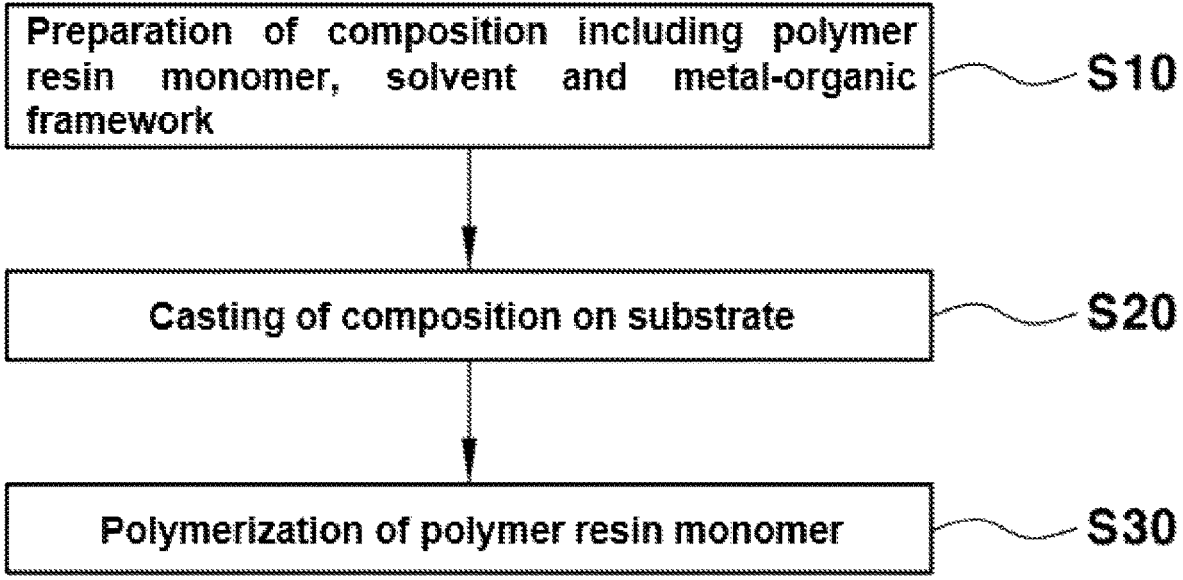
FIG. 4 is a flowchart showing a process of manufacturing the gas separation membrane according to an embodiment of the present invention.

FIG. 4 is a flowchart showing a process of manufacturing the gas separation membrane according to embodiments of the present invention. With reference thereto, the method may include preparing a composition including a polymer resin monomer, a solvent, and a metal-organic framework (S10), casting the composition on a substrate (S20), and polymerizing the polymer resin monomer (S30).

When the gas separation membrane is manufactured by mixing a polymer resin and a metal-organic framework, the metal-organic framework may not be evenly distributed. Accordingly, in embodiments of the present invention, the gas separation membrane is manufactured by mixing the polymer resin monomer and the metal-organic framework, sufficiently dispersing the metal-organic framework, and then polymerizing the polymer resin monomer.

The polymer resin monomer may include a monomer of a polymer resin selected from the group consisting of polyimide, polysulfone, polydimethylsiloxane (PDMS), polyvinylidene fluoride (PVDF), and combinations thereof.

A detailed description of the metal-organic framework is described above and will be omitted below.

The solvent may be selected from the group consisting of N-methylpyrrolidone, benzene, toluene, xylene, and combinations thereof.

The composition may be prepared by dissolving and/or dispersing the polymer resin monomer in the solvent and then introducing the metal-organic framework thereto. Here, the amount of each component of the composition is not particularly limited, but components may be weighed and mixed such that the gas separation membrane that is ultimately obtained includes 80 wt % to 95 wt % of the polymer resin and 5 wt % to 20 wt % of the metal-organic framework.

The process of casting the composition on the substrate may be performed through, for example, a spin-coating process, a doctor-blade process, a casting-knife process, or the like.

The composition may be cast to a thickness of 100 μm or more, 150 μm or more, or 200 μm or more on the substrate. The thickness thereof may subsequently be decreased during the polymerization of the polymer resin monomer and the removal of the solvent. Hence, in consideration thereof, the composition may be cast so that the thickness of the gas separation membrane that is ultimately obtained may be 100 μm or more, 150 μm or more, or 200 μm or more.

The polymerization of the polymer resin monomer may be carried out by, for example, thermal treatment of the composition cast on the substrate. The thermal treatment conditions, such as temperature, time, atmosphere, and the like, are not particularly limited, and may be set appropriately depending on the polymer resin monomer that is used.

The manufacturing method of embodiments of the present invention may further include removing the solvent after completion of the polymerization of the polymer resin monomer.

A better understanding of embodiments of the present invention will be given through the following examples. However, these examples are merely set forth to illustrate the embodiments of the present invention, and are not to be construed as limiting the scope of the present invention.

Examples 1 to 3

A gas separation membrane including a polymer resin and a metal-organic framework was manufactured by the method described above. Here, the amount of the metal-organic framework was set to 10 wt %. The kinds of components and the thickness of the gas separation membrane are shown in Table 1 below.

Comparative Examples 1 to 6

A gas separation membrane was manufactured as shown in Table 1 below. PET10k refers to PET that allows 10,000 cc of gas to permeate per unit time, and PET15k refers to PET that allows 15,000 cc of gas to permeate per unit time.

TABLE 1

| No. | Polymer resin | Metal-organic framework | Thickness [μm] |
|---|---|---|---|
| Example 1 | Polysulfone | UiO-66 | 179.6 |
| Example 2 | Polysulfone | UiO-66 | 252 |
| Example 3 | Polyimide | UiO-66 | 161 |
| Comparative Example 1 | Polysulfone | — | 129.5 |
| Comparative Example 2 | Kaptone ® (made by Dupont) | — | 61 |
| Comparative Example 3 | PET10k | — | 44 |
| Comparative Example 4 | PET15k | — | 44 |
| Comparative Example 5 | PCTFE | — | 55 |
| Comparative Example 6 | PFA | — | 45 |

Test Example

The gas separation membrane of each of Examples 1 to 3 and Comparative Examples 1 to 4 was cut to a circular shape having a diameter of about 4 cm, and the mixed gas of oxygen, carbon dioxide and dimethylether (DME) was made to permeate through the entire surface area thereof at about 1.2 atm. The amounts of oxygen, carbon dioxide, and dimethylether were measured through mass spectrometry by capturing the gas that passed through each gas separation membrane for a predetermined period of time. The results are shown in FIGS. 5 to 7.

Figure 5:
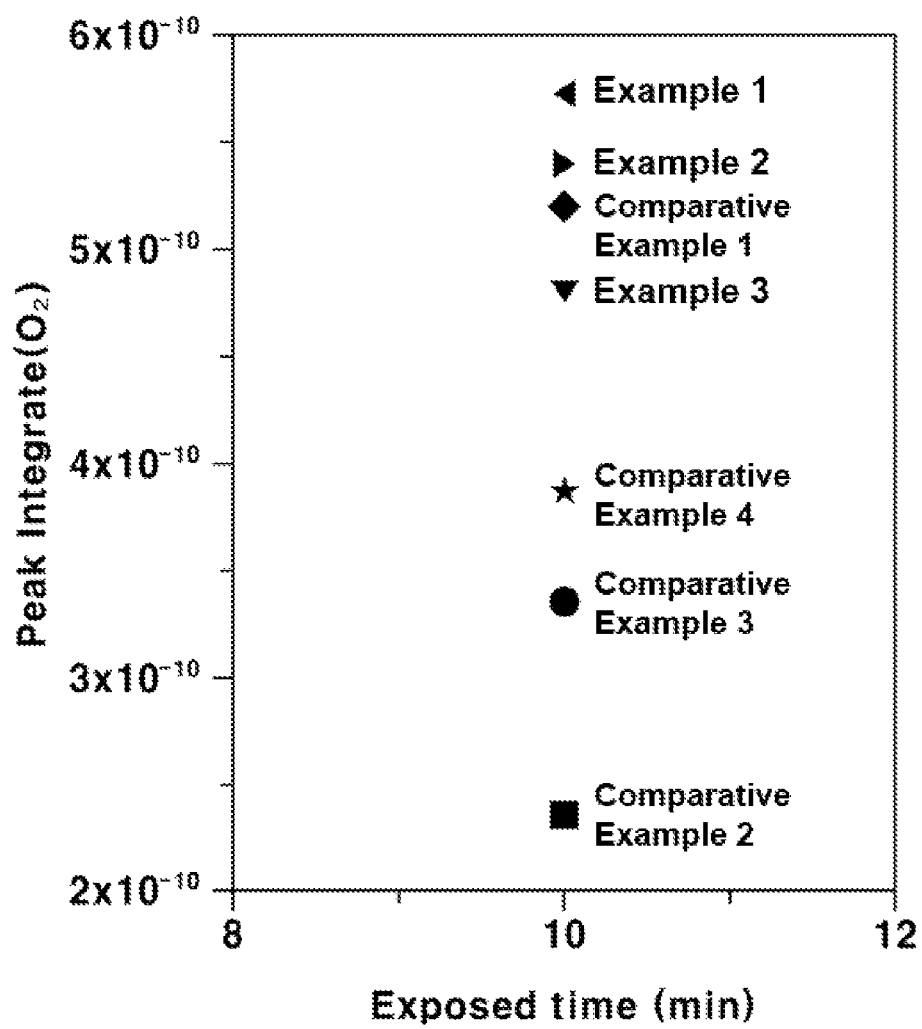
FIG. 5 shows the results of measurement of oxygen permeability of the gas separation membranes of Examples 1 to 3 and Comparative Examples 1 to 4.

FIG. 5 shows the results of measurement of oxygen permeability of the gas separation membranes of Examples 1 to 3 and Comparative Examples 1 to 4. When comparing the results of Examples 1 and 2 with those of Comparative Example 1, the gas separation membrane of Examples 1 and 2 was much thicker than the gas separation membrane of Comparative Example 1, but the oxygen permeability thereof was higher. This is deemed to be because the gas separation membrane of Examples 1 and 2 includes the metal-organic framework. When comparing the results of Examples 1 to 3 with those of Comparative Examples 2 to 4, the gas separation membrane according to embodiments of the present invention exhibited higher oxygen permeability than the known polymer film.

Figure 6:
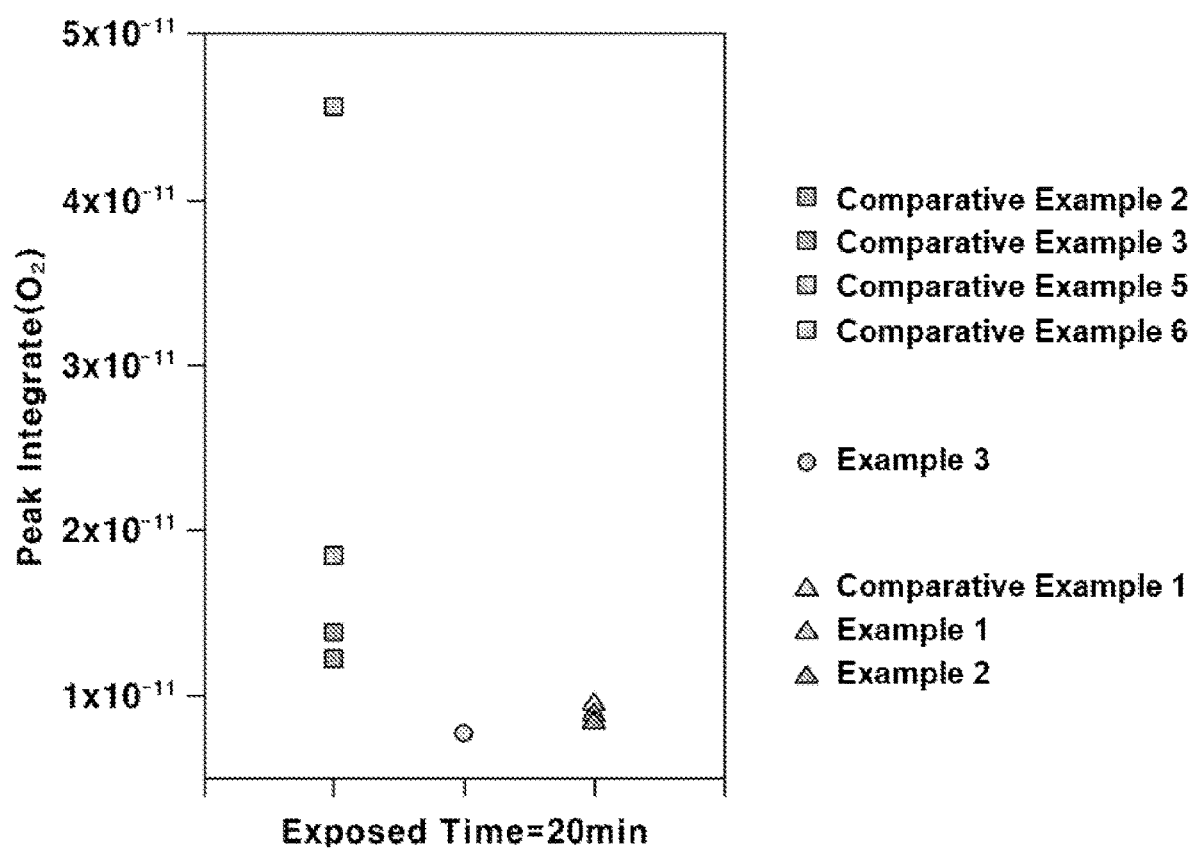
FIG. 6 shows the results of measurement of carbon dioxide permeability of the gas separation membranes of Examples 1 to 3, Comparative Examples 1 to 3, Comparative Example 5 and Comparative Example 6.

FIG. 6 shows the results of measurement of carbon dioxide permeability of the gas separation membranes of Examples 1 to 3, Comparative Examples 1 to 3, Comparative Example 5 and Comparative Example 6. With reference thereto, the carbon dioxide permeability of Example 3 was the lowest, and the carbon dioxide permeability of Examples 1 to 3 was lower than that of the Comparative Examples. This is deemed to be because carbon dioxide in the mixed gas is adsorbed to the metal-organic framework contained in Examples 1 to 3.

Figure 7:
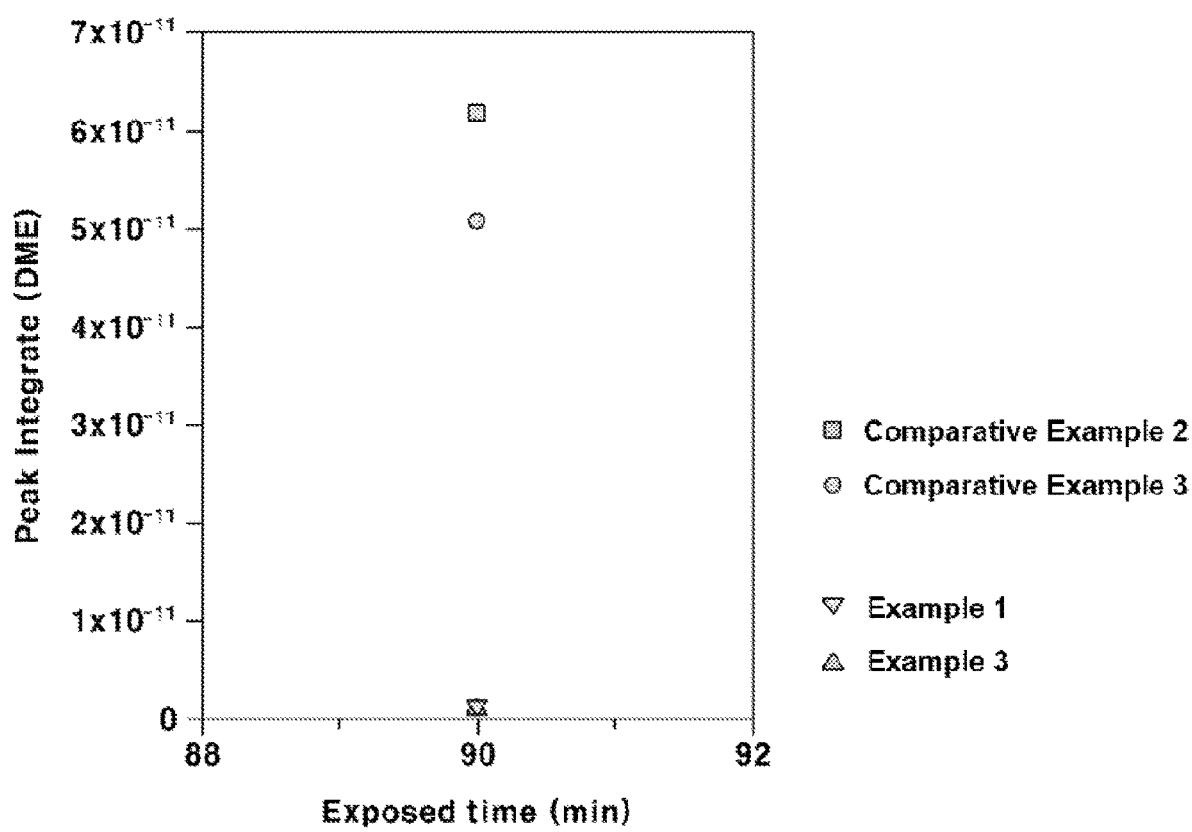
FIG. 7 shows the results of measurement of dimethylether permeability of the gas separation membranes of Example 1, Example 3, Comparative Example 2, and Comparative Example 3.

FIG. 7 shows the results of measurement of dimethylether permeability of the gas separation membranes of Example 1, Example 3, Comparative Example 2, and Comparative Example 3. With reference thereto, the dimethylether permeability of Example 1 and Example 3 was at least wo times lower than that of Comparative Example 2 and Comparative Example 3. This is deemed to be because the gas separation membrane of Example 1 and Example 3 is thicker and the metal-organic framework prevents permeation of the organic compound.

The scope of the present invention as described above in connection with the test examples and examples of the embodiments of the present invention is not limited to the test examples and examples. Various modifications and improvements by those skilled in the art using the basic concepts of the embodiments of the present invention as defined in the following claims are also included in the scope of the present invention.

What is claimed is:

1. A lithium-air battery, comprising:
   a battery cell; and
   a case configured to accommodate the battery cell and comprising an inlet communicating with outside and an outlet communicating with outside;
   wherein at least one of the inlet and the outlet is equipped with a gas separation membrane, the gas separation membrane comprising a matrix comprising a polymer resin and a metal-organic framework (MOF) dispersed in the matrix, wherein the gas separation membrane has a thickness of 150 μm or more.

2. The lithium-air battery of claim 1, wherein the polymer resin is selected from the group consisting of polyimide, polysulfone, polydimethylsiloxane (PDMS), polyvinylidene fluoride (PVDF) and combinations thereof.

3. The lithium-air battery of claim 1, wherein the metal-organic framework comprises a metal ion or a metal ion cluster and also comprises an organic ligand for connection thereof connecting the metal ion or the metal ion cluster.

4. The lithium-air battery of claim 3, wherein the metal ion comprises an ion of a metal selected from the group consisting of Zr, Hf, Cr, Ti, Al, Fe, Cu, Co, Mn, Mg, Ni and combinations thereof.

5. The lithium-air battery of claim 3, wherein the organic ligand comprises an organic ligand selected from the group consisting of aromatic dicarboxylic acid, aromatic tricarboxylic acid, imidazole, formate compound and combinations thereof.

6. The lithium-air battery of claim 3, wherein the organic ligand comprises an organic ligand selected from the group consisting of aromatic dicarboxylic acid, aromatic tricarboxylic acid, imidazole compound and combinations thereof.

7. The lithium-air battery of claim 1, wherein the metal-organic framework is selected from the group consisting of UiO-66, UiO-66-NH$_2$, UiO-67, MIL-101, MIL-125, MIL-53, MIL-100, HKUST-1, Co(fm)$_2$, Mn(fm)$_2$, Mg(fm)$_2$ and combinations thereof.

8. The lithium-air battery of claim 1, wherein the metal-organic framework is a porous crystalline compound having pores therein, the pores having an average diameter ranging from 0.5 nm to 10 nm.

9. The lithium-air battery of claim 1, wherein the metal-organic framework has a specific surface area of wo m$^2$/g or more.

10. The lithium-air battery of claim 1, wherein an amount of the metal-organic framework is 5 wt % to 20 Wt %.

11. A lithium-air battery, comprising:
a battery cell; and
a case accommodating the battery cell, wherein the case comprises an inlet communicating with outside and an outlet communicating with outside and wherein the inlet and the outlet are equipped with a gas separation membrane that has a thickness of 150 μm or more, the gas separation membrane comprising:
a matrix comprising a polymer resin; and
a metal-organic framework (MOF) dispersed in the matrix, wherein the metal-organic framework comprises a framework selected from the group consisting of UiO-66-NH$_2$, UiO-67, MIL-53, HKUST-1, Co(fm)$_2$, Mn(fm)$_2$, Mg(fm)$_2$ and combinations thereof.

12. The lithium-air battery of claim 11, wherein the metal-organic framework is a porous crystalline compound having pores therein, the pores having an average diameter ranging from 0.5 nm to 10 nm.

13. The lithium-air battery of claim 11, wherein an amount of the metal-organic framework is 5 wt % to 20 Wt %.

14. A lithium-air battery, comprising:
a battery cell; and
a case accommodating the battery cell, wherein the case comprises an inlet communicating with outside and an outlet communicating with outside and wherein the inlet and the outlet are equipped with a gas separation membrane that has a thickness of 150 μm or more, the gas separation membrane comprising a matrix comprising a polymer resin and a metal-organic framework (MOF) dispersed in the matrix, wherein the metal-organic framework is a porous crystalline compound having pores therein, the pores having an average diameter ranging from 0.5 nm to 10 nm and wherein an amount of the metal-organic framework is 5 wt % to 20 Wt %.

15. The lithium-air battery of claim 14, wherein the polymer resin comprises a resin selected from the group consisting of polyimide, polysulfone, polydimethylsiloxane (PDMS), polyvinylidene fluoride (PVDF) and combinations thereof.

16. The lithium-air battery of claim 15, wherein the metal-organic framework comprises a metal ion or a metal ion cluster and also comprises an organic ligand for connecting the metal ion or the metal ion cluster.

17. The lithium-air battery of claim 16, wherein the metal ion comprises an ion of a metal selected from the group consisting of Zr, Hf, Cr, Ti, Al, Fe, Cu, Co, Mn, Mg, Ni and combinations thereof.

18. The lithium-air battery of claim 16, wherein the organic ligand comprises an organic ligand selected from the group consisting of aromatic dicarboxylic acid, aromatic tricarboxylic acid, imidazole compound and combinations thereof.

19. The lithium-air battery of claim 14, wherein the metal-organic framework comprises a framework selected from the group consisting of UiO-66, UiO-66-NH$_2$, UiO-67, MIL-101, MIL-125, MIL-53, MIL-100, HKUST-1, Co(fm)$_2$, Mn(fm)$_2$, Mg(fm)$_2$ and combinations thereof.

20. The lithium-air battery of claim 14, wherein the metal-organic framework has a specific surface area of 100 m$^2$/g or more.

* * * * *

UNITED STATES PATENT AND TRADEMARK OFFICE
CERTIFICATE OF CORRECTION

PATENT NO. : 11,964,241 B2  
APPLICATION NO. : 18/334639  
DATED : April 23, 2024  
INVENTOR(S) : Oh et al.

Page 1 of 1

It is certified that error appears in the above-identified patent and that said Letters Patent is hereby corrected as shown below:

In the Claims

In Column 9, in Claim 9, Line 27, delete "wo" and insert -- 100 --.

In Column 9, in Claim 10, Line 30, after "20" delete "Wt" and insert -- wt --.

In Column 10, in Claim 13, Line 4, after "20" delete "Wt" and insert -- wt --.

In Column 10, in Claim 14, Line 19, delete "Wt" and insert -- wt --.

Signed and Sealed this  
Eleventh Day of June, 2024

*Katherine Kelly Vidal*

Katherine Kelly Vidal  
*Director of the United States Patent and Trademark Office*